United States Patent [19]

Bertha

[11] Patent Number: 4,666,514

[45] Date of Patent: May 19, 1987

[54] HYDROMETALLURGICAL PROCESS FOR RECOVERING SILVER FROM COPPER-ELECTROLYSIS ANODE SLUDGE

[75] Inventor: Josef Bertha, Brixlegg, Austria

[73] Assignee: Austria Metall Aktiengesellschaft, Vienna, Austria

[21] Appl. No.: 819,158

[22] Filed: Jan. 14, 1986

[30] Foreign Application Priority Data

Jan. 25, 1985 [AT] Austria .................. 199/85

[51] Int. Cl.$^4$ .......................... C22B 11/04
[52] U.S. Cl. .................... 75/118 R; 423/22;
423/38; 423/39; 423/40; 423/46; 423/87;
423/150; 423/491; 423/508; 75/97 A; 75/101
R; 75/114; 75/115; 75/117; 75/119; 75/120;
75/121; 204/111
[58] Field of Search ............ 423/38, 39, 40, 491,
423/46, 150, 22, 87, 508; 75/97 A, 101 R, 114,
115, 117, 118 R, 119, 120, 121; 204/111

[56] References Cited

U.S. PATENT DOCUMENTS

| | | | |
|---|---|---|---|
| 2,060,539 | 11/1936 | Spies ................ | 75/108 |
| 3,594,157 | 7/1971 | Hendrickson et al. ........... | 423/43 |
| 3,658,510 | 4/1972 | Hoffmann et al. ........... | 75/99 |
| 4,094,668 | 6/1978 | Yannopoulos et al. .......... | 75/99 |
| 4,342,592 | 8/1982 | Lamb ................ | 423/38 |
| 4,372,782 | 2/1983 | Salter et al. ............. | 75/118 R |
| 4,439,235 | 3/1984 | Simpson ............. | 423/38 |

FOREIGN PATENT DOCUMENTS 0089184 9/1983 European Pat. Off. .
3145006 6/1982 Fed. Rep. of Germany .
452832 1/1962 United Kingdom .

Primary Examiner—John Doll
Assistant Examiner—Robert L. Stoll
Attorney, Agent, or Firm—Karl F. Ross; Herbert Dubno

[57] ABSTRACT

A hydrometallurgical process for recovering pure silver from sludge formed at the anode in copper electrolysis and other sources comprises suspending the sludge, after removing Pb, Ni, and Cu, in hydrochloric acid, subsequently adding an alkali metal hypochlorite, preferably NaOCl, to the resulting suspension to convert the silver present to AgCl, filtering to separate the AgCl containing solid residue from the filtrate containing the other metallic elements, and finally working up the AgCl containing residue to obtain high purity silver. Preferably the high purity silver is obtained from the AgCl containing residue by leaching with an alkaline ammoniacal solution to dissolve the silver as the soluble silver diamine chloride, and subsequently reducing the silver diamine chloride to silver metal. The reducing agent for the silver diamine chloride is preferably either a $Cu^+$ containing compound such as CuCl or a metal powder such as copper or bronze powder.

13 Claims, 1 Drawing Figure

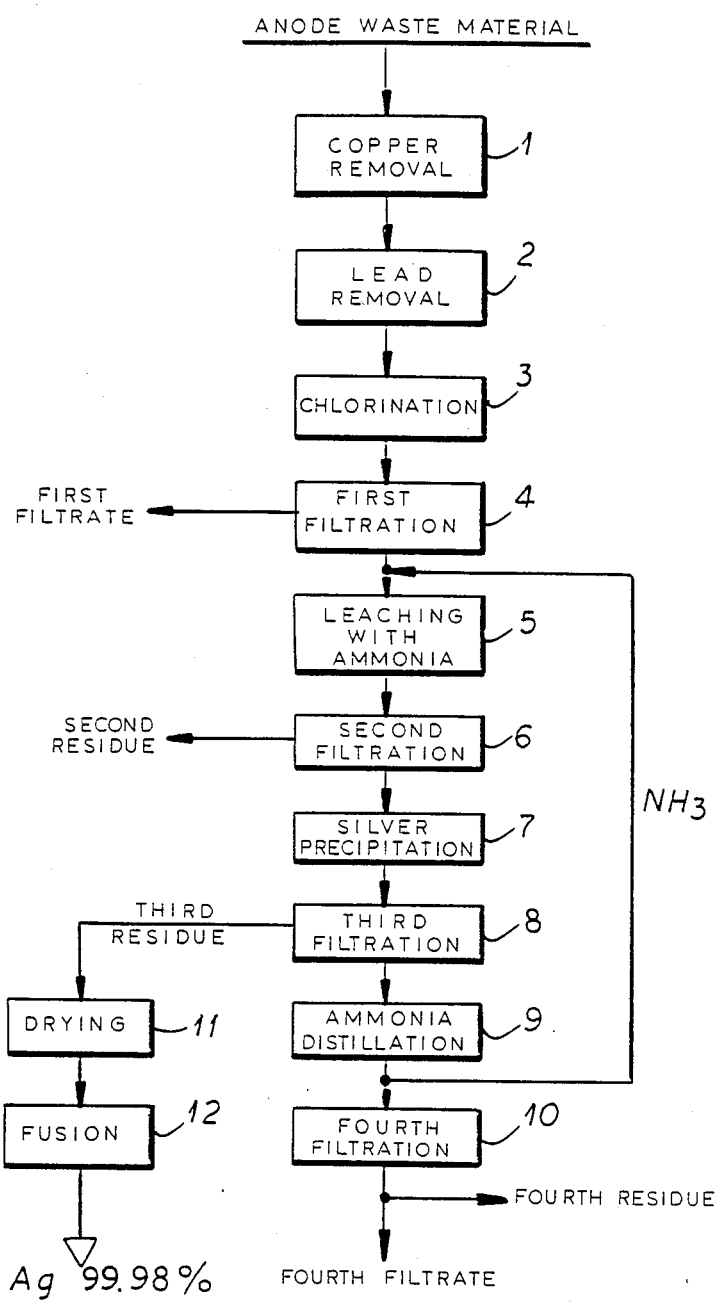

HYDROMETALLURGICAL PROCESS FOR RECOVERING SILVER FROM COPPER-ELECTROLYSIS ANODE SLUDGE

FIELD OF THE INVENTION

My present invention relates to a process for recovering i.e. extracting high purity silver metal from copper-electrolysis anode sludge and, more particularly, to a hydrometallurgical process for recovering silver metal from the anode mud.

BACKGROUND OF THE INVENTION

In the electrolytic refining of copper, the anode mud or sludge contains variable amounts of silver, gold, platinum, palladium, selenium, tellurium, arsenic, antimony, copper, nickel and lead among others, which may be valuable and should be recovered.

The chief purpose of the existing anode mud recovery or work-up processes is the separation and purification particularly of the precious and other metals that are present. At present a number of different processes for recovery of precious metals from these electrochemical wastes are being used.

In some prior art processes the anode mud or sludge is subjected to pyrometallurgical treatment in an air or flame furnace (cupellation process) and the resulting anode silver is further processed or purified electrochemically.

These processes have a number of significant disadvantages, particularly the effort, time and energy consumed in furnace melting and the production of a variety of slags which remove many noble metals, thereby requiring many recycle steps to recover them.

Newer processes combine electrochemical and pyrometallurgical process steps. Thus, for example, according to one process (u.S. Pat. No. 4,,002,544 or German Patent document DE-AS 25 43 027) a decoppered anode sludge is roasted and sulfatized at approximately 160°-300° C., in order to decompose the copper and silver selenides and tellurides. Only the Ag, Se, and Te are dissolved in the hot sulfuric acid, indeed about 95% of the Ag, Se, and Te pass into the sulfuric acid.

From the filtered sludge salts Ni can be removed by leaching with hot water and Au, Pt, and Pd can be obtained from the waste residue according to known processes.

From the sulfuric acid the Ag, Se, and Te are cathodically separated by electrolysis after dilution, the metal powder containing these elements is melted under an air stream ($SeO_2$ and $TeO_2$ are volatilized) and electrolytic recovery of the resulting anode silver leads to the desired silver metal.

These processes indeed circumvent the melting in the furnace but involve an additional electrolysis in separating of the Ag, Se, and Te. Besides a clean separation of the elements is not possible with the sulfatization and heating step.

In another process (DDR U.S. Pat. No. 146712, 1981 see also lnternational classes C22B 15/08; C22B 11/64) the anode mud, freed from Se and Te, is subjected to a nitric acid leaching to remove Ag, Cu, and Pb, whereby Ag, Cu, and Pb go into solution as nitrates and are further processed by an electrolysis in which silver is deposited, while from the mud residue according to one of the known pyrometallurgical or hydrometallurgical processes the entire Au, Pt, and Pd content can be extracted.

The silver contained in the nitric acid solution is separated chiefly by an electrolysis process, and the residual silver is obtained by cementation with Cu. From the desilvered solution Pb is precipitated with $H_2SO_4$ as $PbSO_4$, filtered, and the filtrate is distilled and rectified to remove $H_2SO_4$ and $HNO_3$ and the crystalline slurry remaining in the distillation sump is taken up with $H_2O$ and processed to Cu or copper salts.

In the presence of Pd in anode this last process is not suitable, because Pd is highly soluble in nitric acid, and a separate process for removal of this precious metal must be employed. Another disadvantage is that, on account of a high Pd or Cu content, an excessively expensive electrochemical process is required.

Furthermore the direct chlorination of anode mud or sludge without prior pb separation has been suggested (See German Patent document DE-OS-21 17 513). The anode mud is mixed with dilute hydrochloric acid to make a watery paste, into which with agitation gaseous chlorine is introduced at a temperature of about 100° C., in order to dissolve almost all the metals contained in the mud with the exception of silver.

The slurry must be filtered hot and also washed hot, in order to remove the bulk of the Pb as $PbCl_2$. Subsequently extraction of the AgCl occurs with ammonia, whereby Ag is separated from the remaining accompanying materials, i.e. Sb,Sn, and $SiO_2$. The silver is obtained from the ammoniacal solution by evaporation of the ammonia, digestion of the AgCl precipitate in an aqueous NaOH solution, and reduction of the $Ag_2O$ occuring by a reducing sugar to pure pulverulent silver metal, which to be made available in customary form must be remelted.

However the use of $Cl_2$ gas in a strong HCl solution (up to 12 N, i.e. 432 g/l) creates significant corrosion of the apparatus and requires use of a reflux condenser for the HCl gas vapor. Also the separation of $PbCl_2$ from the sludge or anode mud on a large scale in the filter press because of the large temperature drop required is scarcely attainable. A clean separation of the pb and the Ag is not in fact attained in practice with this method.

OBJECTS OF THE INVENTION

It is an object of my invention to provide an improved process for recovering silver from silver containing copper-electrolysis anode mud whereby the drawbacks of earlier processes are avoided.

It is also an object of my invention to provide an improved economical process for obtaining high purity silver metal from silver containing sludge, particularly anode mud formed in copper-electrochemical processing, which is less expensive than prior art processes, since it does not require the substantial work and time and energy expenditure of a strictly pyrometallurgical process, but also does not require comparatively expensive electrochemical separations.

It is another object of my invention to provide an improved process for obtaining high purity silver metal from silver containing sludge formed in electrochemical and other manufacturing processes, in which the steps used to separate the noble metals present are clean, allowing substantially complete separations leading to chemically pure products in high yield.

It is yet another object of my invention to provide an improved process for obtaining high purity silver metal from silver containing sludge formed in electrochemical or other manufacturing processes, in which the individual steps of the process lead to complete separation of the components desired, but also the steps are significantly easier to perform, safer, and more noncorrosive than those of the prior art.

SUMMARY OF THE INVENTION

Anode sludge of copper electrolysis containing silver and with copper, nickel and lead already separated therefrom by wet chemical treatment, is subjected to chlorination by hypochlorite in the presence of hydrochloric acid to decompose the very stable selenide, telluride and other highly insoluble compounds. The chlorination is performed by addition of an alkali metal hypochlorite, for example a concentrated aqueous hypochlorite solution, preferably NaOCl, to a cold hydrochloric acid-anode mud suspension.

This results in the in situ generation of nascent chlorine, which arises directly at the point the OCl is introduced, and the chlorine thus generated is extremely reactive so that in a comparatively short time the selenium, tellurium, and platinum are brought into solution and the silver present is quantitatively converted to AgCl according to the chemical equations:

$$MOCl + 2 HCl \rightarrow MCl + 2Cl + H_2O \quad (1)$$

$$Ag_2Se + 2O_2 + 2Cl \rightarrow 2 AgCl + SeO_4^{-2} \quad (2)$$

where M is an alkali metal cation, preferably Na.

Besides directly forming nascent chlorine(Cl.) directly in situ, the process according to my invention has the further advantage that NaOCl is much easier to handle and use than chlorine gas. The hypochlorite salt is not only easier to measure out, but has great advantages in regard to operator and environmental safety considerations, and also is a more economical choice in regard to investment and operation costs.

An additional advantage in contrast to other chlorination processes is that the reaction conditions are improved, particularly the chlorination can be performed at room temperature. After filtration of the above mentioned suspension, one finds the gold, palladium, platinum, selenium, and tellurium in the filtrate, which is further processed to recover these elements as desired.

The AgCl-containing filtered residue is leached with ammoniacal solution at room temperature with a high degree of agitation as a means of extraction and filtration. This solution extracts the silver present in the residue as $Ag(NH_3)_2Cl$ which is soluble, while one returns the remaining filter cakes, after filtration and washing, to the shaft furnace.

The silver containing filtrate is reacted in a gas tight reactor with agitation with a $Cu^{+1}$ containing ammoniacal solution and reduces the $Ag^+$ in the soluble $Ag(NH_3)_2Cl$ to metallic silver residue according to following chemical equation:

$$Ag(NH_3)_2Cl + CuCl + 2NH_3 \rightarrow Cu(NH_3)_4Cl_2 + Ag \downarrow \quad (3)$$

The $Cu^+$ containing reducing agent can be a copper-I halide, preferably CuCl or a compound having the formula $MCuCl_2$ such as $NaCuCl_2$ (where $M^+$ is $Na^+$) or having the formula $M(CuCl_2)_2$ (where $M^{+2}$ is $Ca^{+2}$ for example) can be used. The addition of these compounds to the ammoniacal silver solution can be effected in neutral, acidic or ammoniacal solutions.

The precipitated metallic silver filtered, washed, dryed, and without addition of a melting aid is melted. The product silver metal is 99.98% pure.

From the filtrate formed with the silver containing residue the bulk of the ammonia present is recovered by addition of a suitable quantity of $Ca(OH)_2$, calcium hydroxide, and subsequent distillation.

The solid distillation solid residue will contain a copperoxychloride compound with some lime, which can be recycled. The filtrate remaining after these stages does not pose an environmental hazard and can be discarded.

The chemical equation most important in describing the $NH_3$ recovery is:

$$4 Cu(NH_3)_4Cl_2 + 3 Ca(OH)_2 \rightarrow 3 CaCl_2 + 16 NH_3 + CuCl_2 \cdot 3Cu(OH)_2 \quad (4)$$

Furthermore when a large excess of $Ca(OH)_2$ is used CuO also is a product.

The reduction to metallic silver from the soluble silver diamine chloride can be effected by a variety of reducing agents. For example the reduction to metallic silver of the ammoniacal silver diamine chloride can be effected by addition of copper or bronze (80% Cu, 20% Zn) powder at ambient or higher temperatures, to form a solid which after filtration, washing, and drying is melted to form a high purity metallic silver of 99.98% purity. Moreover one can mix the Ag containing filtrate mentioned above in a gas tight reactor with stirring with copper or bronze powder to reduce the $Ag^+$ contained in the $Ag(NH_3)_2Cl$ to metallic silver.

BRIEF DESCRIPTION OF THE DRAWING

The above and other objects, features and advantages of my invention will become more readily apparent from the following description and specific example given with reference to the accompanying drawing the sole FIGURE of which is a flow chart of the process.

SPECIFIC DESCRIPTION AND EXAMPLE

As seen in steps 1 to 2 of the drawing lead and copper are first removed from the copper electrolyses anode sludge, then 69.5 kg of moist anode mud is suspended in 50 l of dilute aqueous HCl in a gas tight reactor in step 3. Into this suspension a concentrated solution of NaOCl is slowly introduced with stirring at room temperature. In about 1½ hours the chlorination was found to be completed, the temperature having climbed from 22° C. to 35° C.

The first solid residue or filter cake, which contains all the silver as AgCl in step 5 of our process is mixed with 10 kg of green seal chalk powder (99.5% $CaCO_3$) as an aid to extraction and filtration, and then suspended in 60 l of 10% aqueous ammonia. The suspension is stirred approximately 3 hours, in order to dissolve the $Ag^+$ as soluble $Ag(NH_3)_2Cl$. Then the suspension was filtered in step 6 in a gas tight filter press a second filtrate and second solid residue which is washed thoroughly. The second solid residue is introduced to a furnace.

The $Ag^+$ containing second filtrate in step 7 is mixed with a slight excess of a $NaCuCl_2$ solution, and thus the $Ag^+$ is quantitatively precipitated as metallic silver. After a third filtration, washing and drying the silver containing solid is melted in a graphite melting pot to form high purity silver metal which is 99.98% pure.

The third filtrate is next mixed with about 5 kg of calcium hydroxide, the free ammonia is completely distilled therefrom in step 9, the distillation residue is subject to a fourth filtration and is recycled, while the wash liquor is discarded.

I claim:

1. A hydrometallurgical process for recovery of about greater than 99% purity silver metal from electrolysis anode sludge which comprises the steps of:
   (a) suspending said sludge after removing any lead and the water soluble component of any nickel and copper present, in hydrochloric acid;
   (b) subsequently adding an alkali metal hypochlorite to the resulting suspension to form nascent chlorine therein and to dissolve any gold, platinum, palladium, or selenides, or tellurides present therein, and to convert any silver present to a solid silver chloride; and
   (c) filtering the product formed in step (b) to form a first filtrate and to remove a first solid residue containing said solid silver chloride therefrom.

2. A hydrometallurgical process according to claim 1 wherein said alkali metal hypochlorite is added to said resultant suspension in a concentrated aqueous solution.

3. A hydrometallurgical process according to claim 1 further comprising mixing five parts by weight of said first solid residue with one part by weight of a calcium carbonate containing solid to form a solid mixture, and leaching said solid mixture with an ammonia containing solution, in order to convert said silver chloride therein into a soluble silver diamine chloride, and filtering to obtain a second filtrate containing said soluble silver diamine chloride and a second residue.

4. A hydrometallurgical process according to claim 3 wherein said calcium carbonate containing solid is a green seal chalk powder, which is substantially 99.5% $CaCO_3$.

5. A hydrometallurgical process according to claim 3 further comprising forming a first reaction mixture by mixing said second filtrate with a $Cu^+$ containing substance at ambient or greater temperatures to reduce said soluble silver diamine chloride to said silver, and filtering said first reaction mixture to form a third filtrate and a third solid residue comprising said silver, washing and drying said third solid residue, melting said third solid resid to obtain said high purity silver metal.

6. A hydrometallurgical process according to claim 5 wherein said $Cu^+$ containing substance is provided in an aqueous acidic basic or ammoniacal solution in the form of a copper halide selected from the group which consists of $CaCl_4$, $MCuCl_2$ and $M'(CuCl_2)_2$ where M and M' are respectively a monovalent and a divalent cation.

7. A hydrometallurgical process according to claim 5 further comprising mixing calcium hydroxide with said third filtrate, heating to boiling the mixture of said calcium hydroxide with said third filtrate to recover ammonia therefrom, and filtering the mixture resulting from removal of said ammonia from said mixture of said calcium hydroxide with said third filtrate to obtain a fourth solid residue which may be further processed metallurgically.

8. A hydrometallurgical process according to claim 3, further comprising forming a second reaction mixture by mixing said second filtrate with a metallic powder to reduce said soluble silver diamine chloride at ambient or higher temperatures, filtering the mixture formed by adding said metallic powder to said second filtrate to form a fifth filtrate and fifth solid residue, washing and drying said fifth solid residue, and melting said fifth solid residue to obtain said high purity silver metal.

9. A hydrometallurgical process according to claim 8 wherein said metallic powder comprises pure copper powder or bronze powder consisting essentially of 80% by weight copper and 20% by weight zinc.

10. A hydrometallurgical process according to claim 3, further comprising reducing said solid silver chloride to a silver residue, and purifying said silver residue to obtain said high purity silver metal.

11. A hydrometallurgical process according to claim 3 wherein said ammonia containing solution is a 10% aqueous ammonia solution and is mixed with said solid mixture with stirring for three to six hours at ambient temperature.

12. A hydrometallurgical process according to claim 1 wherein said hydrochloric acid is a less than 12N aqueous hydrochloric acid.

13. A hydrometallurgical process for recovery of greater than about 99% purity silver metal from a waste material formed at an anode in copper electrolysis, which besides silver also contains ions selected from the group consisting of lead, gold, platinum, selenium, tellurium, antimony, arsenic, bismuth, copper, nickel, zinc, iron, sulfate, chloride and silicic acid and mixtures thereof, comprising the steps of:
   (a) suspending said waste material, after removing lead and water soluble compounds of nickel and copper, in hydrochloric acid;
   (b) subsequently adding sodium hypochlorite solution to the resulting suspension, and thereby chlorinating said resultant suspension, so as to convert said silver present to a solid silver chloride, while leaving said gold, said platinum, said selenium and said tellurium in the resulting chlorine treated solution;
   (c) separating said solid silver chloride from the product formed in step (b) to form a first filtrate containing said gold and said platinum and a first solid residue containing said solid silver chloride;
   (d) treating said first solid residue with aqueous ammonia to extract said silver to form an $Ag(NH_3)_2Cl$ containing aqueous solution;
      (d$_1$) forming a first reaction mixture by mixing said $Ag(NH_3)_2Cl$ containing aqueous solution with a sufficient amount of a $Cu^+$ containing compound reactive therewith at a temperature of at least ambient temperature with stirring so that the $Ag^+$ present is quantitatively converted to metallic silver,
      (d$_2$) filtering said first reaction mixture to form a third filtrate and a silver residue, washing and drying said silver residue, and
      (d$_3$) melting said silver residue to obtain said high purity silver metal;
   (e) mixing calcium hydroxide with said third filtrate to form an ammonia containing mixture;
   (f) recovering said ammonia for recycling by distillation from said ammonia containing mixture; and
   (g) subsequently filtering a solution formed in step (f) to form a fourth residue which may be further processed by heating to recover copper.

* * * * *